(12) United States Patent
Lin et al.

(10) Patent No.: US 7,845,926 B2
(45) Date of Patent: Dec. 7, 2010

(54) MOLD APPARATUS FOR FORMING SCREW THREADS

(75) Inventors: Hou-Yao Lin, Taipei Hsien (TW); Sheng-Jung Yu, Taipei Hsien (TW); Sheng-Hsi Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 228 days.

(21) Appl. No.: 12/327,896

(22) Filed: Dec. 4, 2008

(65) Prior Publication Data

US 2009/0304844 A1    Dec. 10, 2009

(30) Foreign Application Priority Data

Jun. 4, 2008    (CN) .................. 2008 1 0301989

(51) Int. Cl.
*B29C 45/44* (2006.01)
(52) U.S. Cl. ................ 425/190; 425/192 R; 425/438; 425/441; 425/DIG. 58
(58) Field of Classification Search ................. 425/190, 425/192 R, 330, 438, 441, 556, 577, DIG. 5, 425/DIG. 58; 264/318, 328.1
See application file for complete search history.

(56) References Cited

U.S. PATENT DOCUMENTS

| | | | | |
|---|---|---|---|---|
| 1,475,032 A * | 11/1923 | Shrum et al. ................ | 72/397 |
| 2,330,762 A * | 9/1943 | Tooker ........................ | 425/104 |
| 2,949,636 A * | 8/1960 | Mastin ........................ | 425/394 |
| 3,266,098 A * | 8/1966 | Bucy .......................... | 249/141 |
| 3,779,688 A * | 12/1973 | Jullien-Davin ............... | 425/441 |
| 3,811,645 A * | 5/1974 | Feist .......................... | 249/68 |
| 4,515,342 A * | 5/1985 | Boskovic .................... | 249/122 |
| 4,768,747 A * | 9/1988 | Williams et al. ............. | 249/63 |
| 4,889,480 A * | 12/1989 | Nakamura et al. .......... | 425/577 |
| 5,135,700 A * | 8/1992 | Williams et al. ............ | 264/318 |
| 5,160,752 A * | 11/1992 | Urayama et al. ............ | 425/577 |
| 5,407,344 A * | 4/1995 | Rombalski et al. .......... | 425/190 |
| 5,490,966 A * | 2/1996 | Peterson et al. ............. | 264/318 |
| 5,498,387 A * | 3/1996 | Carter et al. ................ | 264/219 |
| 5,595,702 A * | 1/1997 | Hiroki et al. ............... | 264/318 |
| 5,635,126 A * | 6/1997 | Nomura et al. ............. | 264/334 |
| 5,702,736 A * | 12/1997 | Henein ....................... | 425/556 |
| 5,837,182 A * | 11/1998 | Hiroki et al. ............... | 264/318 |
| 7,104,774 B2 * | 9/2006 | Buttigieg .................... | 425/190 |
| 7,600,445 B2 * | 10/2009 | Dubay ........................ | 74/53 |
| 7,677,878 B2 * | 3/2010 | Chen et al. .................. | 425/190 |

(Continued)

*Primary Examiner*—Yogendra N Gupta
*Assistant Examiner*—Emmanuel S Luk
(74) *Attorney, Agent, or Firm*—Clifford O. Chi

(57) ABSTRACT

A mold apparatus includes a female mold combined with a male mold. The female mold and male mold respectively include at least one female mold unit and one male mold unit, at least a pair of screw tooth blocks, a first fastener, and a second fastener. The female mold unit and the male mold unit respectively include a space with an opening and a through hole connecting with the space. The screw tooth block is mounted in the space. The screw tooth block includes an inserted concavity in a pair of opposite surfaces respectively and a through hole in the other opposite surfaces, the inserted concavity comprising an inner screw. The fastener, through the through hole of the mold unit and the through hole of the screw tooth block, fastens the screw tooth block in the space of the mold unit.

8 Claims, 3 Drawing Sheets

U.S. PATENT DOCUMENTS

| | | | |
|---|---|---|---|
| 2003/0031752 A1* | 2/2003 | Liao et al. | 425/577 |
| 2004/0109913 A1* | 6/2004 | Drees | 425/556 |
| 2005/0098295 A1* | 5/2005 | Dubay | 164/312 |

* cited by examiner

MOLD APPARATUS FOR FORMING SCREW THREADS

BACKGROUND

1. Technical Field

The invention generally relates to molding apparatus and, particularly, to a mold apparatus for forming screw threads of a lens barrel.

2. Description of Related Art

Engagement of a lens barrel and a holder is adjusted by changing standard of a mold apparatus for forming screw threads of the lens barrel. A thread-forming portion of the mold apparatus is manufactured by electric discharge machining. The mold process requires reworking if the electric discharge machining over-processes the thread-forming portion of the mold apparatus. In this way, the manufacture of the mold apparatus becomes time-consuming and costly.

What is needed, therefore, is a mold apparatus for forming screw threads of a lens barrel addressing the limitations described.

DETAILED DESCRIPTION OF THE EMBODIMENT

Figure 1:
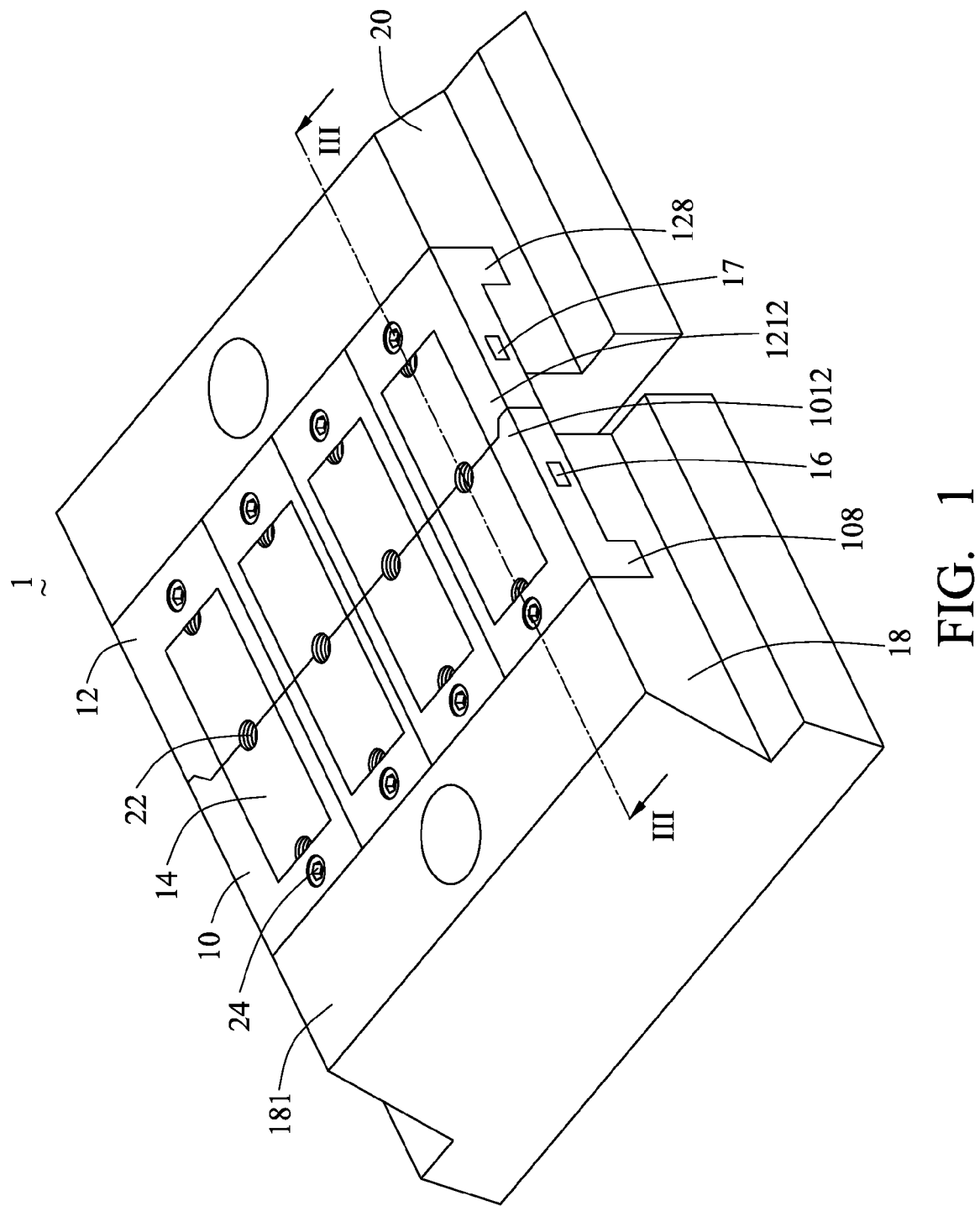
FIG. 1 is a perspective view of a mold apparatus in accordance with an embodiment of the present disclosure.
Figure 2:
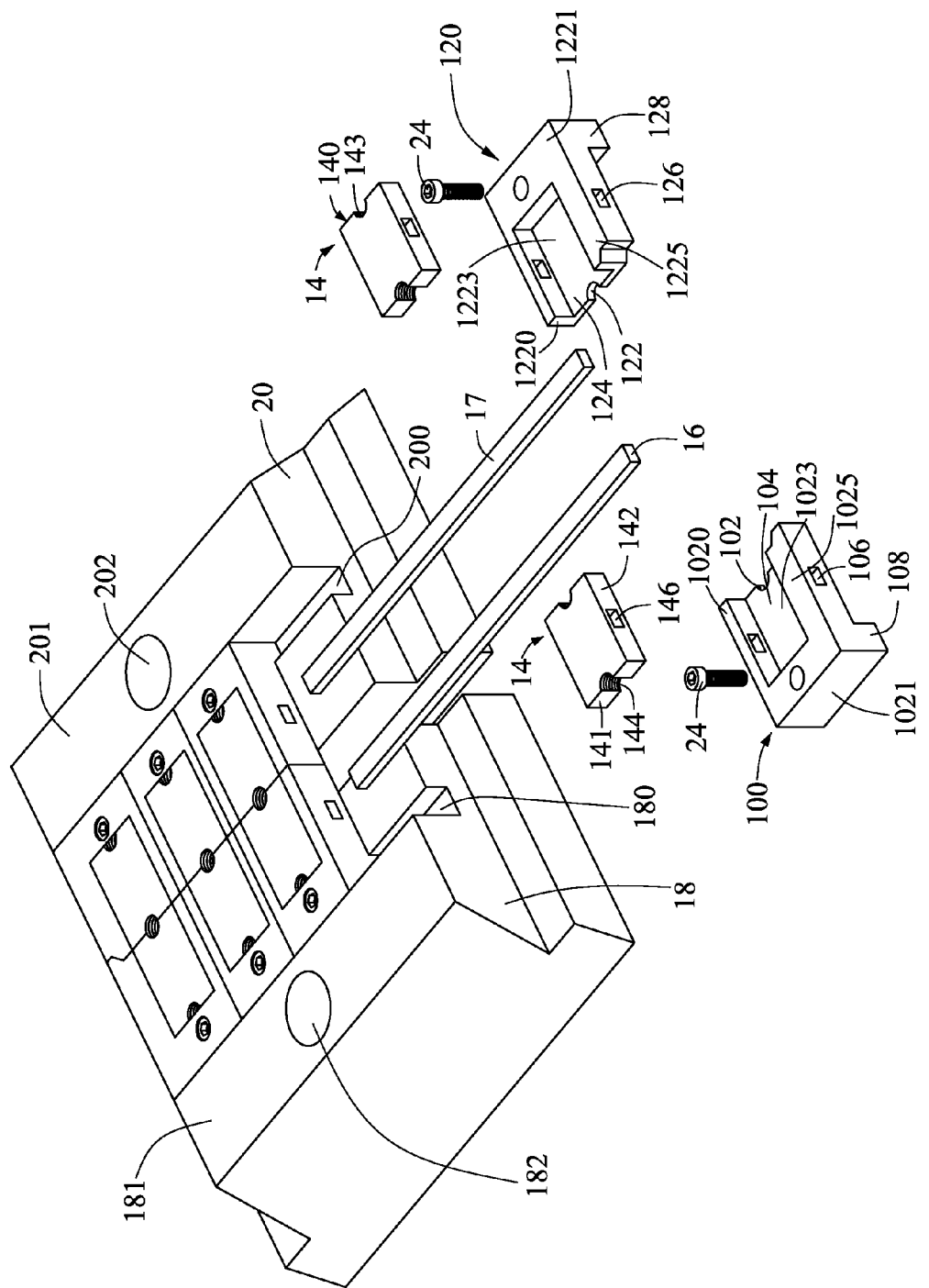
FIG. 2 is an exploded perspective view of a mold apparatus in accordance with an embodiment of the present disclosure.
Figure 3:
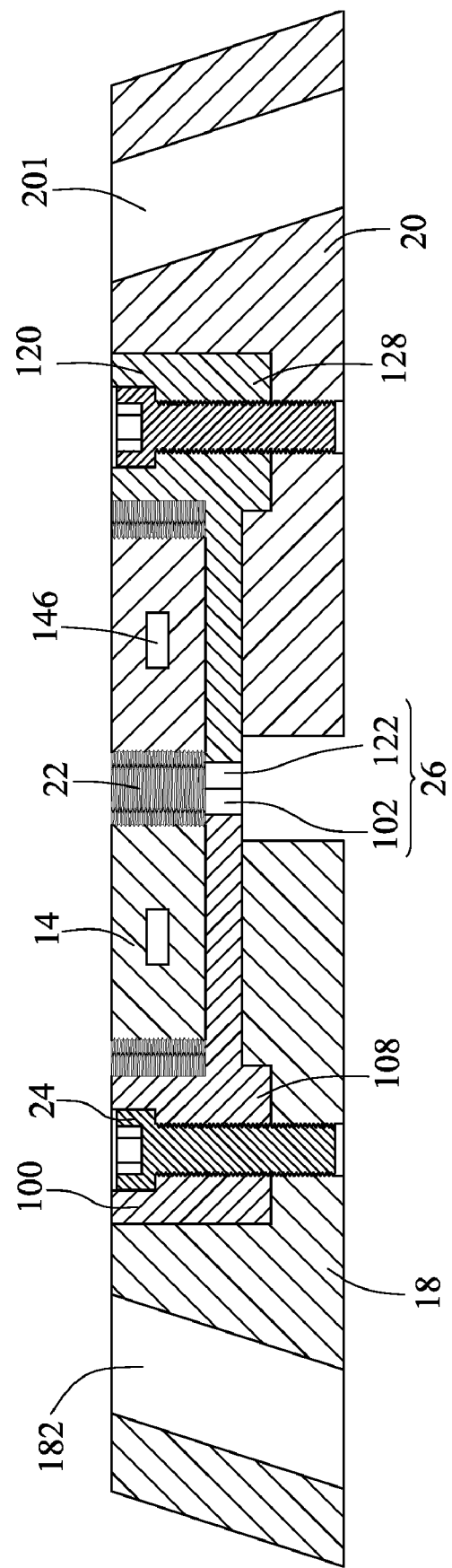
FIG. 3 is a cross section taken along plane III-III of the mold apparatus in FIG. 1.

Referring to FIGS. 1 to 3, a mold apparatus 1 for forming screw threads in accordance with an embodiment of the present disclosure includes a female mold 10 combined with a male mold 12. The female mold 10 includes at least one female mold unit 100, at least one screw tooth block 14, and a first fastener 16. The male mold 12 includes at least one male mold unit 120, at least one screw tooth block 14, and a second fastener 17.

The female mold unit 100 includes a bottom wall 1023, two parallel sidewalls 1020, 1025 vertically extending upward from opposite sides of the bottom wall 1023 respectively, and a mounting wall 1021 vertically mounted to the bottom wall 1023. A space with an opening 104 is defined between each sidewall 1020, 1025 and the mounting wall 1021, receiving the screw tooth block 14. Two through holes 106 are defined in the two sidewalls 1020, 1025 respectively, connecting with the space. An indentation 102 is defined on the opening 104 side of the bottom wall 1023. A protrusion 108 is defined extending perpendicularly downward from the mounting wall 1021.

The male mold unit 120 includes a bottom wall 1223, two parallel sidewalls 1220, 1225 vertically extending upward from opposite sides of the bottom wall 1223 respectively, and a mounting wall 1221 vertically mounted to the bottom wall 1223. A space with an opening 124 is defined between each sidewall 1220, 1225 and the mounting wall 1221, receiving the screw tooth block 14. Two through holes 126 are defined in the two sidewalls 1220, 1225 respectively, connecting with the space. An indentation 122 is defined on the opening 124 side of the bottom wall 1223. A protrusion 128 is defined extending perpendicularly downward from the mounting wall 1221.

A pair of opposite surfaces 140, 141 of each screw tooth block 14 defines an inserted concavity 143 housing an inner screw 144. The other pair of opposite surfaces 142 of the screw tooth block 14 defines a block through hole 146 penetrating the screw tooth block 14.

The first fastener 16 is through the through hole 106 of the female mold unit 100 and the through hole 146 of the screw tooth block 14 to fasten the screw tooth block 14 in the space of the female mold unit 100. The second fastener 17 is through the through hole 126 of the male mold unit 120 and the through hole 146 of the screw tooth block 14 to fasten the screw tooth block 14 in the space of the male mold unit 120. Here, the first fastener 16, the second fastener 17, the through 146 of the screw tooth block 14, the through hole 106 of the female mold unit 100 and the through hole 126 of the male mold unit 120 are polygonal.

The mold apparatus 1 further includes a female mold support 18 supporting the female mold unit 100 and a male mold support 20 for supporting the male mold unit 120. The female mold support 18 defines a step indentation 180 receiving the protrusion 108 of the female mold unit 100. The male mold support 20 defines a step indentation 200 receiving the protrusion 128 of the male mold unit 120. A fastener 24 passing through a hole of the mounting wall 1021 of the female mold unit 100 fixes the female mold unit 100 to the female mold support 18. A fastener 24 passing through a hole of the mounting wall 1221 of the male mold unit 120 fixes the male mold unit 120 to the male mold support 20.

A surface 181 of the female mold support 18 defines an inclined round hole 182 receiving an inclined guide pin (not shown). A top surface 201 of the male mold support 20 defines an inclined round hole 202 receiving an inclined guide pin (not shown). The two inclined guide pins move the female mold unit 100 and male mold unit 120 to open mold or closing mold. The female mold unit 100 defines an engaging portion 1012 for engaging the male mold unit 120. The male mold unit 120 defines an engaging portion 1212 for engaging the female mold unit 100. Thus, the two inserted concavities 143 of the two screw tooth blocks 14 cooperatively define a screw hole 22. The indentation 102 of the female mold unit 100 and the indentation 122 of the male mold unit 120 cooperatively define a molding hole 26. The molding hole 26 forms a barrel. The screw hole 22 generates a screw thread of the barrel.

The size of the inner screw 144 of the screw tooth block 14 can be chosen according to the different manufacturing requirements. If the screw tooth block 14 is broken, the first fastener 16 and the second fastener 17 are withdrawn from the through hole 146 of the screw tooth block 14 to change the screw tooth block 14.

Thus, less time is spent changing the screw tooth block 14. This not only reduces costs of the mold apparatus 1 by changing the screw tooth block 14, but also improves the manufacturing efficiency of the mold apparatus 1.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mold apparatus comprising:
    a female mold comprising:
        at least one female mold unit each comprising a space with an opening and a through hole connecting the space;

at least one screw tooth block each mounted in the space of one of the at least one female mold unit and comprising an inserted concavity separating a pair of opposite surfaces respectively and a through hole in the other opposite surfaces, the inserted concavity comprising an inner fastener;

a first fastener passing through the through hole of each of the at least one female mold unit and the through hole of each of the at least one screw tooth block to fasten the corresponding screw tooth block in the space of the female mold unit;

a male mold combined with the female mold and comprising:

at least one male mold unit, corresponding to the at least one female mold unit, each comprising a space with an opening and a through hole connecting with the space;

at least one screw tooth block each mounted in the space of each of the at least one male mold unit and comprising an inserted concavity in a pair of opposite surfaces respectively and a through hole in the other opposite surfaces, the inserted concavity comprising an inner screw;

a first fastener passing through the through hole of each of the at least one male mold unit and the through hole of the corresponding screw tooth block to fasten the screw tooth block in the space of the male mold unit.

2. The mold apparatus as claimed in claim 1, wherein each of the at least one female mold unit defines an engaging portion for engaging the male mold unit and each of the at least one male mold unit defines a corresponding engaging portion for engaging the corresponding female mold unit.

3. The mold apparatus as claimed in claim 1, further comprising a female mold support supporting the female mold and a male mold support supporting the male mold, wherein the female mold support and the male mold support can move the female mold and male mold to open or close the mold.

4. The mold apparatus as claimed in claim 3, wherein each of the at least one female mold unit defines a protrusion, the female mold support defines a step indentation receiving the protrusion of each of the at least one female mold unit, and each of the male mold unit defines a protrusion, the male mold support defines a step indentation receiving the protrusion of each of the at least one male mold unit.

5. The mold apparatus as claimed in claim 4, wherein each of the at least one the female mold unit is fixed to the female mold support via a fastener passing through a through hole defined in the female mold unit, and each of the at least one the male mold unit is fixed to the male mold support via a fastener passing through a through hole defined in the male mold unit.

6. The mold apparatus as claimed in claim 1, wherein one surface with the inserted concavity of each screw tooth block in each of the at least one female mold unit is capable of contacting with one surface with the inserted concavity of the corresponding screw tooth block in one of the at least one male mold unit, the two inserted concavities of the two screw tooth blocks cooperatively define a screw hole.

7. The mold apparatus as claimed in claim 1, wherein each female mold unit defines an indentation, the corresponding male mold unit defines an indentation, and the two indentations cooperatively define a molding hole.

8. The mold apparatus as claimed in claim 1, wherein the first fastener, the second fastener, the through hole of the screw tooth block, the through hole of the female mold unit and the through hole of the male mold unit are polygonal.

* * * * *